(12) United States Patent
Qi et al.

(10) Patent No.: US 8,208,362 B2
(45) Date of Patent: Jun. 26, 2012

(54) ACKNOWLEDGEMENT CHANNEL DESIGN FOR WIRELESS NETWORKS

(75) Inventors: Xin Qi, Beijing (CN); He Wang, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 387 days.

(21) Appl. No.: 12/553,644

(22) Filed: Sep. 3, 2009

(65) Prior Publication Data

US 2010/0061327 A1 Mar. 11, 2010

Related U.S. Application Data

(60) Provisional application No. 61/094,757, filed on Sep. 5, 2008.

(51) Int. Cl.
| | |
|---|---|
| *H04J 11/00* | (2006.01) |
| *H04J 1/00* | (2006.01) |
| *H04B 7/204* | (2006.01) |
| *H04W 4/00* | (2009.01) |
| *H04L 27/28* | (2006.01) |

(52) U.S. Cl. ........ 370/203; 370/319; 370/329; 370/343; 375/260

(58) Field of Classification Search .......... 370/203–210, 370/235–236.2, 252, 280, 319–321, 326, 370/328–330, 335–345, 347–348, 522; 375/130–132, 259–260, 267, 275, 299, 335, 375/347; 714/779, 790

See application file for complete search history.

(56) References Cited

U.S. PATENT DOCUMENTS

| | | | |
|---|---|---|---|
| 6,456,306 B1 | 9/2002 | Chin et al. | |
| 6,577,862 B1 | 6/2003 | Davidson et al. | |
| 7,617,073 B2 | 11/2009 | Trinon et al. | |
| 8,040,854 B2 * | 10/2011 | Furueda et al. | 370/334 |
| 2005/0232135 A1 * | 10/2005 | Mukai et al. | 370/208 |
| 2007/0242786 A1 | 10/2007 | Kim et al. | |
| 2008/0101286 A1 | 5/2008 | Wang et al. | |
| 2008/0107056 A1 | 5/2008 | Choi et al. | |
| 2008/0125048 A1 * | 5/2008 | Pi | 455/63.1 |
| 2008/0139212 A1 | 6/2008 | Chen et al. | |

(Continued)

FOREIGN PATENT DOCUMENTS

EP  1613107 A2  1/2006

(Continued)

OTHER PUBLICATIONS

3GPP, "3rd Generation Partnership Project", Technical Specification Group Radio Access Network, Evolved Universal Terrestrial Radio Access (E-UTRA), Medium Access Control (MAC) protocol specification, Release 8, 3GPP TS 36.321 V8.2.0, May 2008, 33 pages.

(Continued)

*Primary Examiner* — Tri H Phan
(74) *Attorney, Agent, or Firm* — Brake Hughes Bellermann LLP

(57) ABSTRACT

Various example embodiments are disclosed. According to an example embodiment, a technique may include transmitting a message to allocate resources to a mobile station in a wireless network for an uplink acknowledgement channel, the acknowledgement channel including three subtiles including a subtile from each of three different tiles, each of the three tiles including a plurality of subtiles that includes at least one 2×3 subtile that includes two subcarriers by three Orthogonal Frequency Division Multiplexing (OFDM) symbols and at least one 3×2 subtile that includes three subcarriers by two OFDM symbols.

20 Claims, 11 Drawing Sheets

U.S. PATENT DOCUMENTS

| | | | |
|---|---|---|---|
| 2009/0052381 A1* | 2/2009 | Gorokhov et al. | 370/329 |
| 2009/0304098 A1* | 12/2009 | Chun et al. | 375/260 |
| 2010/0041445 A1 | 2/2010 | Qi et al. | |
| 2010/0111005 A1* | 5/2010 | Ahn et al. | 370/329 |
| 2011/0194538 A1 | 8/2011 | Zheng et al. | |

FOREIGN PATENT DOCUMENTS

| | | | |
|---|---|---|---|
| EP | 1919160 A1 | 5/2008 | |
| WO | 03/069934 A1 * | 8/2003 | |
| WO | 2006/040769 A1 | 4/2006 | |
| WO | 2007/127945 A2 | 11/2007 | |
| WO | 2010/028106 A2 | 3/2010 | |
| WO | 2010/028106 A3 | 5/2010 | |

OTHER PUBLICATIONS

Bourlas, et al., "Persistent Allocation", IEEE 802.16 Broadband Wireless Access Working Group, Mar. 17, 2008, pp. 1-44.

Fong, et al., "Persistent Assignment for VoIP Support", IEEE 802.16 Broadband Wireless Access Working Group, Nov. 4, 2007, pp. 1-4.

Gupta, et al., "Proposal for IEEE 802.16m Sleep Mode Operation", IEEE 802.16 Broadband Wireless Access Working Group, Jul. 16, 2008, pp. 1-18.

IEEE, "Part 16: Air Interface for Broadband Wireless Access Systems", DRAFT Standard for Local and metropolitan area networks, LAN/MAN Standards Committee of the IEEE Computer Society, IEEE Microwave Theory and Techniques Society, IEEE Wireless-Man 802.16, P802.16Rev2/D5, Jun. 2008, 2040 pages.

IEEE, "Part 16: Air Interface for Fixed and Mobile Broadband Wireless Access Systems", Amendment 2: Physical and Medium Access Control Layers for Combined Fixed and Mobile Operation in Licensed Bands and Corrigendum 1, IEEE Std. 802.16e 2005, Feb. 28, 2006, 863 pages.

So, Jae-Woo, "Performance Analysis of Uplink Scheduling Algorithms for VoIP Services in the IEEEE 802.16e OFDMA System", Wireless Personal Communications, vol. 47, No. 2, ISSN: 1572-834X paragraphs 2.4, 3.1, Feb. 9, 2008, pp. 247-263.

Jin, et al., "Power Saving Strategies in IEEE 802.16m", IEEE 802.16 Broadband Wireless Access Working Group, Jul. 7, 2008, pp. 1-6.

Kone, et al., "Sleep Mode Considerations for a Device-Based Power Saving", IEEE 802.16 Broadband Wireless Access Working Group, Jul. 7, 2008, pp. 1-12.

McBeath, et al., "New enhancements in WiMAX", Leading Edge, Issue 41, Jun. 2008, pp. 46-48.

International Search Report and Written Opinion for International Application No. PCT/US2009/055818, mailed on Apr. 13, 2010, 20 pages.

Qi, et al., "Considerations on 802.16m Sleep mode", IEEE 802.16 Broadband Wireless Access Working Group, Jul. 7, 2008, pp. 1-5.

Ren, et al., "Adaptive DRX Scheme for Optimal Power Saving", IEEE 802.16 Broadband Wireless Access Working Group, Jan. 16, 2008, pp. 1-6.

Son, et al., "Sleep mode operation for IEEE802.16m", Document No. C802.16m-08/721r1, Jul. 7, 2008, 10 pages.

U.S. Appl. No. 13/061,351, filed Feb. 28, 2011, 52 pages.

International Preliminary Report on Patentability and Written Opinion for International Application No. PCT/US2009/055818, mailed on Mar. 17, 2011, 12 pages.

Office Action for U.S. Appl. No. 12/192,534, mailed Apr. 7, 2011, 8 pages.

Office Action Response for U.S. Appl. No. 12/192,534, filed Apr. 28, 2011, 3 pages.

Hamiti, Shkumbin, "The Draft IEEE 802.16m System Description Document", Nokia, IEEE 802.16 Broadband Wireless Access Working Group, IEEE 802.16m-08/003r4 (Jul. 29, 2008), 89 pages.

Cudak, Mark, "IEEE 802.16m System Requirements", Motorola, IEEE 802.16 Broadband Wireless Access Working Group, IEEE 802.16m-07/002r4 (Oct. 19, 2007), pp. 1-26.

Kang, Jianfeng, et al., "IEEE 802.16 Presentation Submission Template (Rev. 9)", IEEE C802.16m-08/xxx, Proposal for IEEE 802.16m Uplink Physical Resource Allocation Unit in Green-field (May 5, 2008), 13 pages.

Non-Final Office Action received for U.S. Appl. No. 12/192,534, mailed on Jun. 2, 2011, 17 pages.

Non-Final Office Action Response filed for U.S. Appl. No. 12/192,534, filed on Dec. 2, 2011, 14 pages.

IEEE, "IEEE Standard for Information Technology—Telecommunications and information exchange between systems—Local and metropolitan area networks—Specific requirements,", Part 11: Wireless LAN Medium Access Control (MAC) and Physical Layer (PHY) Specifications, IEEE Computer Society, IEEE Std. 802.11-2007, Jun. 12, 2007, 1231 pages.

Jung, Woo, et al., "Adaptive sleep mode algorithm in IEEE 802.16e", Proceedings of Asia-Pacific Conference on Communications 2007, Oct. 1, 2007, pp. 483-486.

* cited by examiner

ACKNOWLEDGEMENT CHANNEL DESIGN FOR WIRELESS NETWORKS

CROSS-REFERENCE TO RELATED APPLICATION(S)

This application claims priority to U.S. Provisional patent application Ser. No. 61/094,757 filed on Sep. 5, 2008, entitled "Acknowledgement Channel Design For Wireless Networks," hereby incorporated by reference in its entirety.

TECHNICAL FIELD

This description relates to wireless networks.

BACKGROUND

Orthogonal Frequency Division Multiplexing (OFDM) is a frequency division multiplexing scheme where a number of orthogonal subcarriers to carry data in parallel or at the same time. One OFDM symbol may include a number of subcarrier symbols transmitted at the same time, each subcarrier symbol transmitted via a different orthogonal subcarrier. OFDM multiplexing techniques may provide advantages, such as improved immunity to multi-path fading and inter-symbol interference, for example.

SUMMARY

According to an example embodiment, a method may include transmitting a message to allocate resources to a mobile station in a wireless network for an uplink acknowledgement channel, the acknowledgement channel including three subtiles including a subtile from each of three different tiles, each of the three tiles including a plurality of subtiles that includes at least one 2×3 subtile that includes two subcarriers by three Orthogonal Frequency Division Multiplexing (OFDM) symbols and at least one 3×2 subtile that includes three subcarriers by two OFDM symbols.

According to another example embodiment, an apparatus may include a wireless transceiver and a controller coupled to the transceiver. The apparatus (e.g., the transceiver, under control of the controller) may be configured to transmit a message to allocate resources to a mobile station in a wireless network for an uplink acknowledgement channel. The acknowledgement channel may include three subtiles including a subtile from each of three different tiles, each of the three tiles including a plurality of subtiles that includes at least one 2×3 subtile that includes two subcarriers by three Orthogonal Frequency Division Multiplexing (OFDM) symbols and at least one 3×2 subtile that includes three subcarriers by two OFDM symbols.

According to another example embodiment, a method may include allocating resources to a mobile station for an uplink acknowledgement channel, the acknowledgement channel including three subtiles including a subtile from each of three different tiles, each tile including five subtiles, each of the subtiles of each of the three tiles being either a 2×3 subtile that includes two subcarriers by three Orthogonal Frequency Division Multiplexing (OFDM) symbols or a 3×2 subtile that includes three subcarriers by two OFDM symbols; and receiving either an acknowledgement or a negative acknowledgement from the mobile station via the allocated acknowledgement channel.

According to another example embodiment, an apparatus may include a wireless transceiver and a controller. The apparatus may be configured to allocate resources to a mobile station for an uplink acknowledgement channel, the acknowledgement channel including three subtiles including a subtile from each of three different tiles, each tile including five subtiles, each of the subtiles of each of the three tiles being either a 2×3 subtile that includes two subcarriers by three Orthogonal Frequency Division Multiplexing (OFDM) symbols or a 3×2 subtile that includes three subcarriers by two OFDM symbols. The transceiver may be configured to receive either an acknowledgement or a negative acknowledgement from the mobile station via the allocated acknowledgement channel.

According to another example embodiment, a method may include allocating resources to a mobile station for an uplink acknowledgement channel, the acknowledgement channel including three subtiles including a subtile from each of three different tiles, each tile including seven subtiles, each of the subtiles of each of the three tiles being either a 2×3 subtile that includes two subcarriers by three Orthogonal Frequency Division Multiplexing (OFDM) symbols or a 3×2 subtile that includes three subcarriers by two OFDM symbols; and receiving either an acknowledgement or a negative acknowledgement from the mobile station via the allocated acknowledgement channel.

According to another example embodiment, an apparatus may include a wireless transceiver and a controller. The apparatus may be configured to allocate resources to a mobile station for an uplink acknowledgement channel, the acknowledgement channel including three subtiles including a subtile from each of three different tiles, each tile including seven subtiles, each of the subtiles of each of the three tiles being either a 2×3 subtile that includes two subcarriers by three Orthogonal Frequency Division Multiplexing (OFDM) symbols or a 3×2 subtile that includes three subcarriers by two OFDM symbols. The transceiver may be configured to receive either an acknowledgement or a negative acknowledgement from the mobile station via the allocated acknowledgement channel.

The details of one or more implementations are set forth in the accompanying drawings and the description below. Other features will be apparent from the description and drawings, and from the claims.

DETAILED DESCRIPTION

Figure 1:
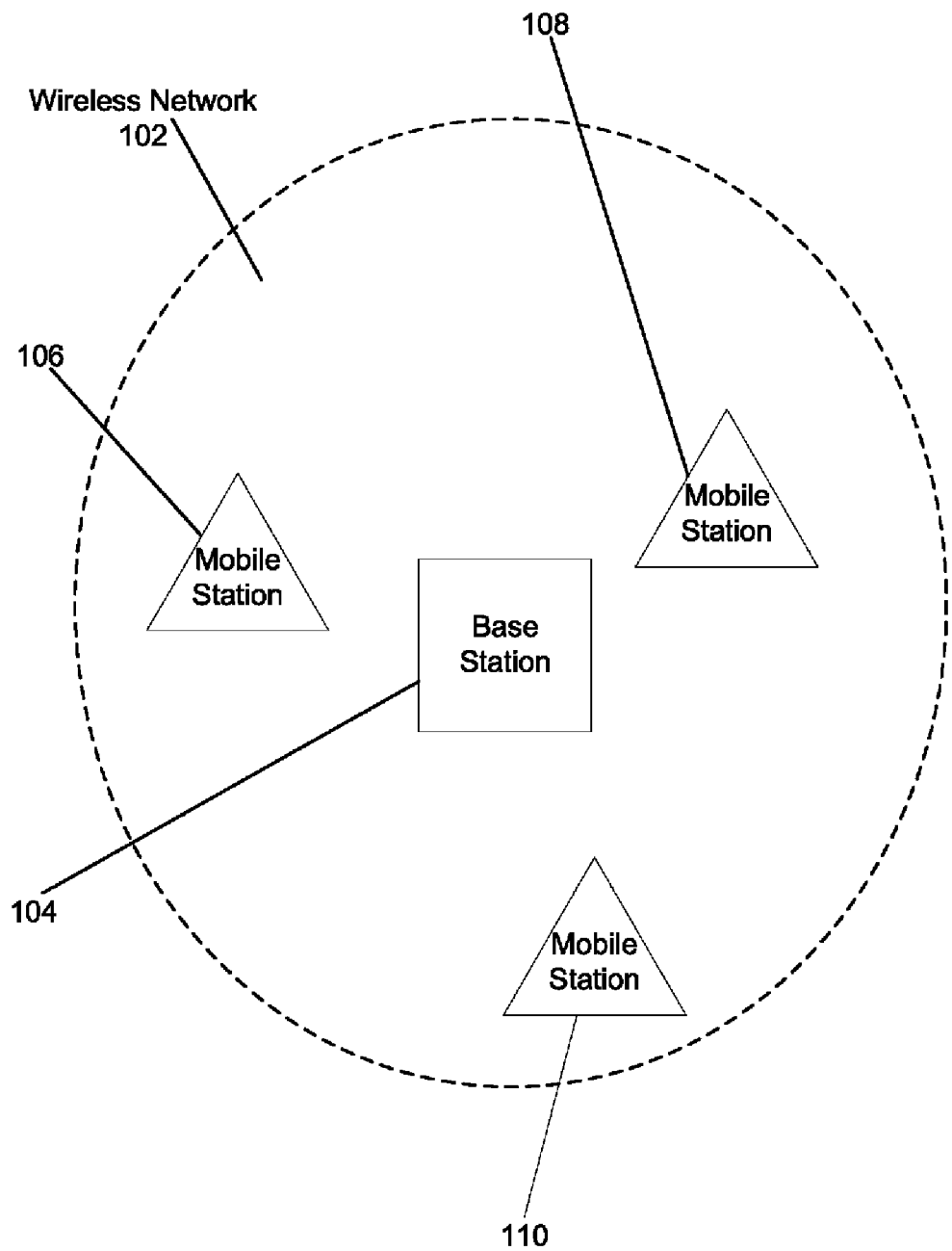
FIG. 1 is a block diagram of a wireless network according to an example embodiment.

FIG. 1 is a block diagram of a wireless network 102 including a base station 104 and three mobile stations 106, 108, 110 according to an example embodiment. While only three mobile stations are shown, any number may be provided. Although not shown, mobile stations 106, 108 and 110 may be coupled to base station 104 via relay stations or relay nodes, for example. The wireless network 102 may include, for example, an IEEE 802.16 Worldwide interoperability for Microwave Access (WiMAX) network, an IEEE 802.11 Wireless Local Area Network (WLAN) network, a cellular telephone network, or other wireless network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" (or "wireless station") may include any type of wireless node, such as base stations, mobile stations, relay stations, etc. While the present disclosure may use some of the terminology of WiMAX or other wireless standards or specifications, the present disclosure may be applicable to any networking or wireless technologies. Base station (BS) 104 may transmit information (e.g., either broadcast, multicast or unicast) in a downlink (DL) direction to each mobile station (MS) 106, 108, 110, and each MS 106, 108, 110 may transmit information to the BS 104 in an uplink (UL) direction.

Also, as used herein, the term Orthogonal Frequency Division Multiplexing (OFDM) includes the variation of OFDM known as Orthogonal Frequency Division Multiple Access (OFDMA), where different OFDM subcarriers or channels are assigned to different users. Thus, the term OFDM may include OFDMA.

Figure 2:
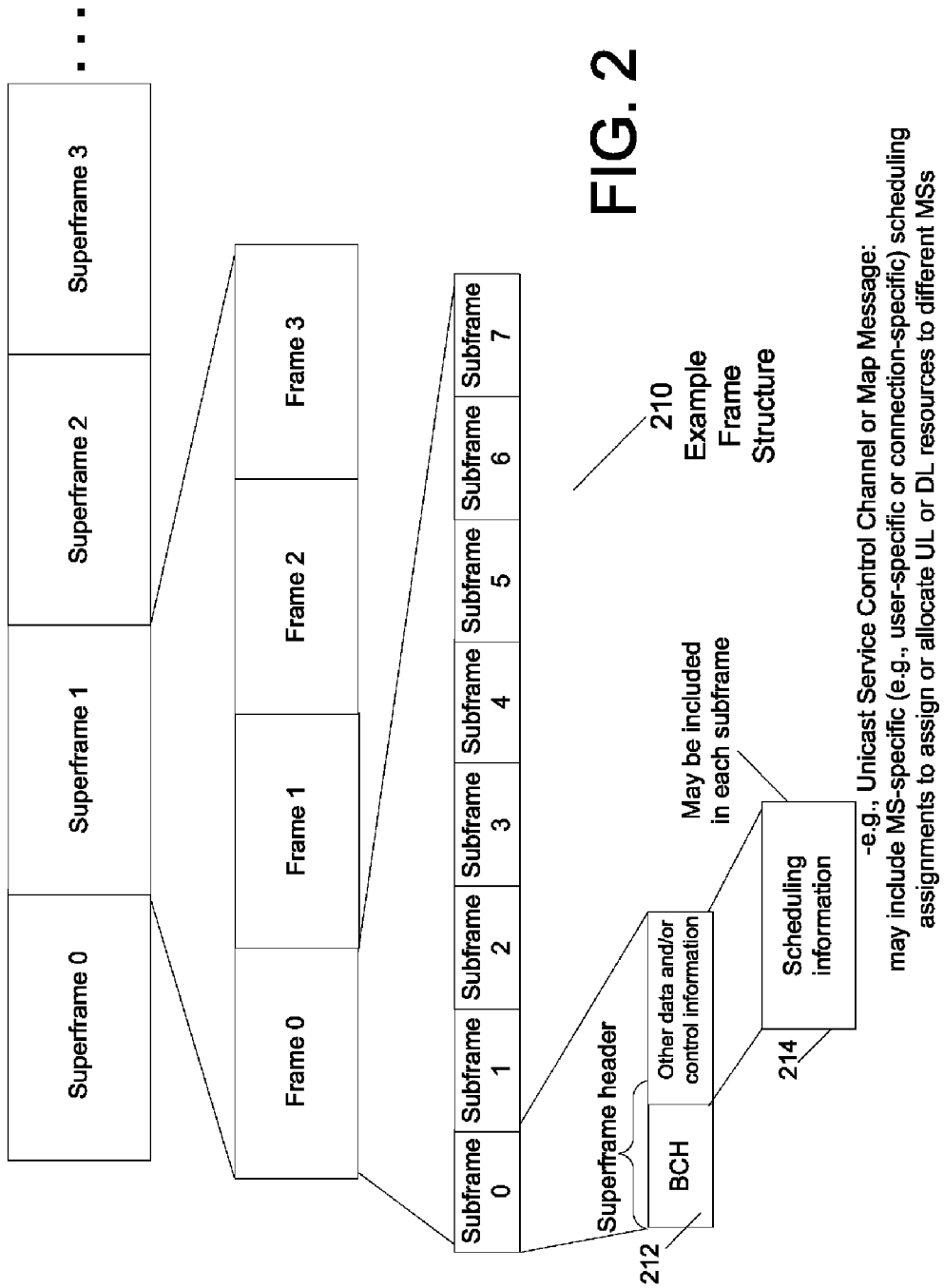
FIG. 2 is a diagram illustrating a frame structure according to an example embodiment.

FIG. 2 is a diagram illustrating a frame structure 210 according to an example embodiment. As shown in FIG. 2, several superframes are shown, including superframe 0, superframe 1, superframe 2, superframe 3, . . . . Each superframe may include a number of frames, such as, for example, four frames per superframe. Each frame may include a number of subframes, such as, for example, eight subframes per frame. For example, as shown, frame 1 may include eight subframes, such as subframes 0-7. Thus, according to an example embodiment, a superframe may include 32 subframes, although any number of subframes may be used. Each subframe may include transmission resources, such as, for example, a number of Orthogonal Frequency Division Multiplexing (OFDM) symbols, e.g., across one or more subcarriers. For example, each subframe may include 5-7 OFDM symbols (or other number of OFDM symbols), depending on a type of the subframe. These are merely examples, and a subframe may include any number of resources or OFDM symbols.

Each subframe may be allocated by BS 104 for either DL transmission or UL transmission. The DL/UL ratio for subframes within a frame may vary, based on control information indicated or transmitted by the BS 104. For example, the DL/UL ratio may be 4/4 (meaning, the frame includes 4 DL subframes followed by 4 UL subframes), may be 5/3, or 3/5 or other ratio, depending on the UL and DL traffic in the network. For example, one or more DL subframes may occur first in a frame for the BS 104 to transmit broadcast and unicast information to MSs, followed by one or more UL subframes that may allow one or more of the MSs opportunities or resources to transmit UL to the BS 104.

Referring to FIG. 2 again, the first subframe (subframe 0 in FIG. 2) of each superframe is typically allocated for downlink transmission. Each superframe may include a superframe header (SFH) that is included in the first subframe of the superframe (subframe 0) of the first frame (frame 0) of the superframe. The SFH may include a number of fields, including a broadcast channel (BCH) 212. The BCH 212 may be used by the BS 104 to broadcast to all MSs or provide essential system parameters and system configuration information 214. The BCH 212 may include a primary broadcast channel (PBCH) and a secondary broadcast channel (SBCH). The PBCH may carry deployment wide (or network wide) common information from the BS, while the SBCH may carry sector specific information, where MSs in wireless network 102 may be divided into different sectors. In an example embodiment, the BCH 212 may be frequency division multiplexed with data within the same subframe (subframe 0).

As noted, BCH 212, e.g., provided within a first subframe of a superframe, may include system configuration information 214. System configuration information 214 may include or describe the system configuration of one or more (or each) of the subframes of a superframe. In some cases, the system configuration information 214 may be considered essential for decoding subframes. System configuration information 214 may include, for example, DL/UL ratio for subframes within the superframe (e.g., first 5 subframes are for DL, and last 3 subframes are for UL), subframe concatenation pattern for a superframe, the configuration information of localized resource allocations (LRAs) and distributed resource allocations (DRAs) within a subframe (which may allocate resources for UL or DL transmissions), permutation method for subcarriers, and/or other system configuration information.

As shown in FIG. 2, each subframe may include other data and control information. Although, FIG. 2 only shows the other data and control information for subframe 0, each subframe may include other data and control information. For example, each subframe may include scheduling information that may schedule, assign or allocate resources to each of the MSs for UL or DL transmissions. The scheduling information in a subframe may allocate or assign resources to a MS for the same subframe, or a future subframe, as examples.

In an example embodiment, the scheduling information may be provided in (or as part of) a unicast service control channel or a Map message. These are merely some examples, and the scheduling information may be provided in a number of different formats, or may be known by different names. The scheduling information may include, for example, MS-specific (e.g., user-specific or connection-specific) scheduling assignments to assign or allocate UL or DL resources to different MSs. The scheduling assignments may be for unicast transmissions (either uplink or downlink), or DL multicast or broadcast transmissions (e.g., where a MS may be a member of one or more multicast groups).

For example, the MS-specific scheduling information that identifies UL resources for a MS may identify UL resources (e.g., time slot and/or subcarriers or other resources) assigned or allocated to the MS to allow the MS an opportunity to transmit UL to the BS, e.g., in a same or different subframe of the same frame or a next frame, as examples. Similarly, the MS-specific scheduling information that assigns DL resources to a MS may identify resources (e.g., time slot and/or subcarriers) within a current subframe or a future subframe (e.g., next subframe) for which the BS will transmit data to the MS.

Figure 3:
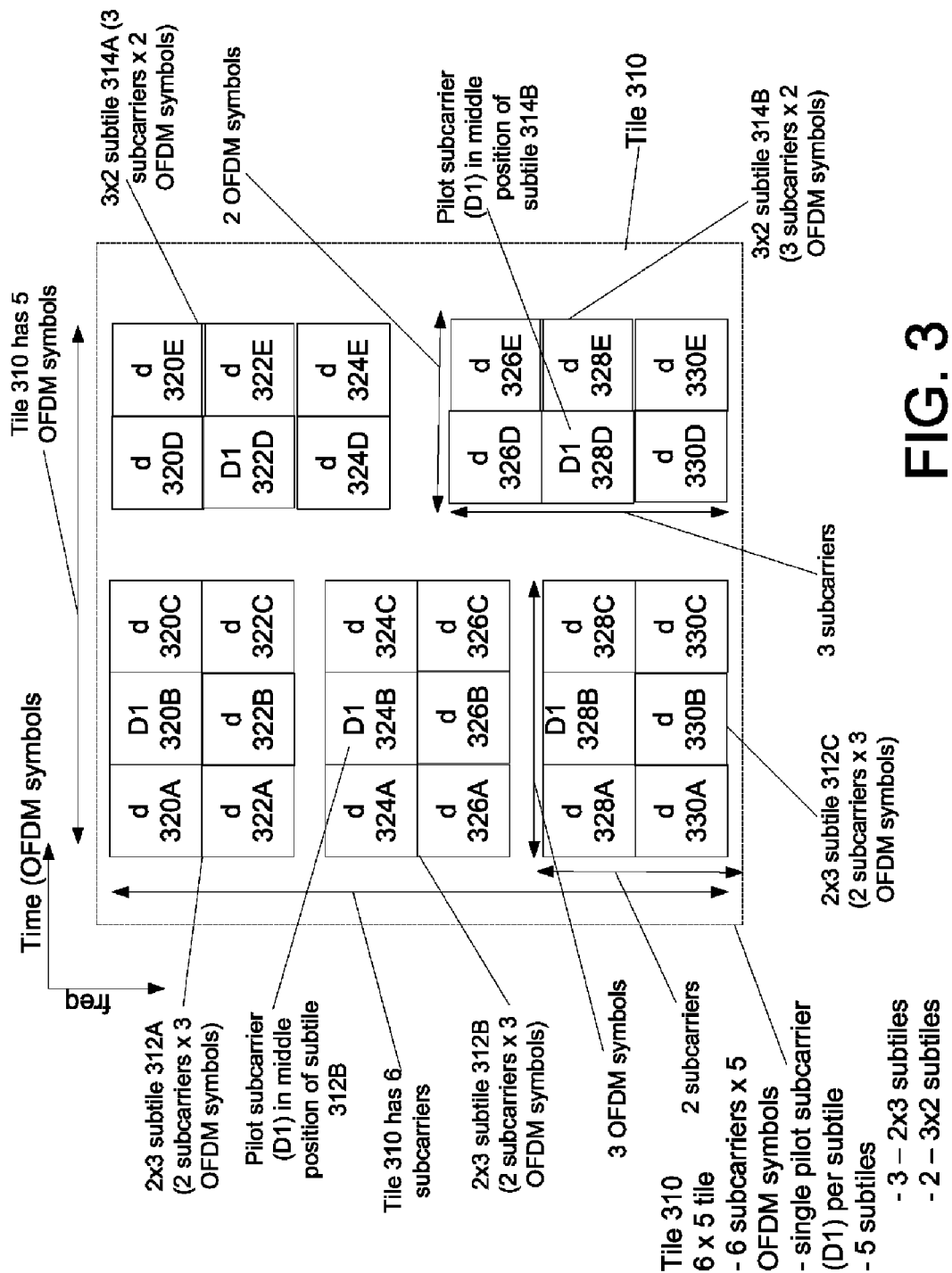
FIG. 3 is a block diagram illustrating a tile structure associated with five OFDM symbols per subframe and a single antenna.

FIG. 3 is a block diagram illustrating a tile structure associated with five OFDM symbols per subframe and a single antenna. Tile 310 is shown in FIG. 3, with time (OFDM symbols) along the horizontal axis, and frequency (or subcarrier number) along the vertical axis. Tile 310 includes six subcarriers across five OFDM symbols, resulting in 30 OFDM subcarrier symbols. Thus, tile 310 may be referred to as a 6×5 tile (6 subcarriers by 5 OFDM symbols), providing a total of 30 subcarrier symbols.

As shown in the tile 310, OFDM symbols are shown as vertical columns of subcarrier symbols, and a row of subcarrier symbols have the same subcarrier frequency. A first OFDM symbol (e.g., OFDM symbol A) may include subcarrier symbols 320A, 322A, 324A, 326A, 328A, and 330A. A second OFDM symbol (OFDM symbol B) may include subcarrier symbols 320B, 322B, 324B, 326B, 328B, and 330B. A third OFDM symbol (OFDM symbol C) may include subcarrier symbols 320C, 322C, 324C, 326C, 328C, and 330C. A fourth OFDM symbol (OFDM symbol D) may include subcarrier symbols 320D, 322D, 324D, 326D, 328D, and 330D. And, a fifth OFDM symbol (OFDM symbol E) may include subcarrier symbols 320E, 322E, 324E, 326E, 328E, and 330E. Of course, each OFDM symbol may include any number of subcarriers, such as 1024, 2048, etc., and tile 310 may include only a portion of such subcarriers.

Also, the subcarrier symbols 320A, 320B, 320C, 320D, and 320E have (or may be provided on) a first subcarrier frequency, subcarrier symbols 322A, 322B, 322C, 322D, and 322E have a second subcarrier frequency, subcarrier symbols 324A, 324B, 324C, 324D, and 324E have a third subcarrier frequency, subcarrier symbols 326A, 326B, 326C, 326D, and 326E have a fourth subcarrier frequency, subcarrier symbols 328A, 328B, 328C, 328D, and 328E have a fifth subcarrier frequency, and subcarrier symbols 330A, 330B, 330C, 330D, and 330E have a sixth subcarrier frequency.

In this example tile structure, tile 310 may include (or be divided into) five subtiles, including three 2×3 subtiles and two 3×2 subtiles, including: a 2×3 subtile 312A, a 2×3 subtile 312B, a 2×3 subtile 312C, a 3×2 subtile 314A and a 3×2 subtile 314B. Each of the 2×3 subtiles includes 2 subcarriers by 3 OFDM symbols. Each of the 3×2 subtiles includes 3 subcarriers by 2 OFDM symbols.

Within each subtile, data subcarriers, or data subcarrier symbols, (that is, subcarriers that are used to transmit data) are identified by a d, while pilot subcarriers, or pilot subcarrier symbols are identified by a D1 (to indicate one pilot subcarrier per subtile). The subtiles having one pilot subcarrier (D1) may be used, for example, for single antenna transmission systems. Whereas subtiles having two pilot subcarriers (e.g., D1, D2) may be used with transmission systems having two (or double) transmit antennas, for example.

As shown in FIG. 3, each of the 2×3 subtiles (312A, 312B, and 312C) includes one pilot subcarrier (or one pilot subcarrier symbol), and five data subcarrier symbols. For example, the 2×3 subtile 312A includes a pilot subcarrier (or pilot subcarrier symbol) 320B, and five data subcarriers or subcarrier symbols, (320A, 320C, 322A, 322B and 322C). The other 2×3 subtiles 312B and 312C have a similar format or pattern, with one pilot subcarrier symbol and five data subcarrier symbols. In addition, each of the three 2×3 subtiles 312A, 312B and 312C has a pilot pattern that includes one pilot subcarrier (D1) in a middle position (e.g., positioned between, or in the middle of other subcarrier symbols) in the subtile. For example, pilot subcarrier symbol 320B is provided in a middle position within 2×3 subtile 312A (e.g., between data subcarrier symbols 320A and 320C), pilot subcarrier symbol 324B is provided in a middle position within subtile 312B, and pilot subcarrier symbol 328B is in a middle position within subtile 312C.

In addition, each of the 3×2 subtiles (314A and 314B) includes one pilot subcarrier symbol (D1) provided in a middle position of the subtile, along with five data subcarrier symbols. For example, the 3×2 subtile 314A includes five data subcarrier symbols 320D, 320E, 322E, 324D and 324E, and one pilot subcarrier symbol 322D provided in a middle position (e.g., between pilot subcarrier symbols 320D and 324D). Subtile 314B includes a same pilot pattern as subtile 314A with a pilot subcarrier symbol 328D provided in a middle position (e.g., between data subcarrier symbols 326D and 330D), along with five data subcarrier symbols 326D, 326E, 328E, 330D and 330E.

According to an example embodiment, there may be two middle positions in the subtile, such as the positions of subcarrier symbols 328D and 328E, and if a pilot subcarrier symbol is in the middle position, it may be located in either of the middle positions, for example (e.g., in the position of either 328D or 328E, since both of these are in the middle, or between other subcarrier symbols). The subtile 314B is merely used as an example to illustrate a middle position of a subtile, according to an example embodiment.

Figure 4:
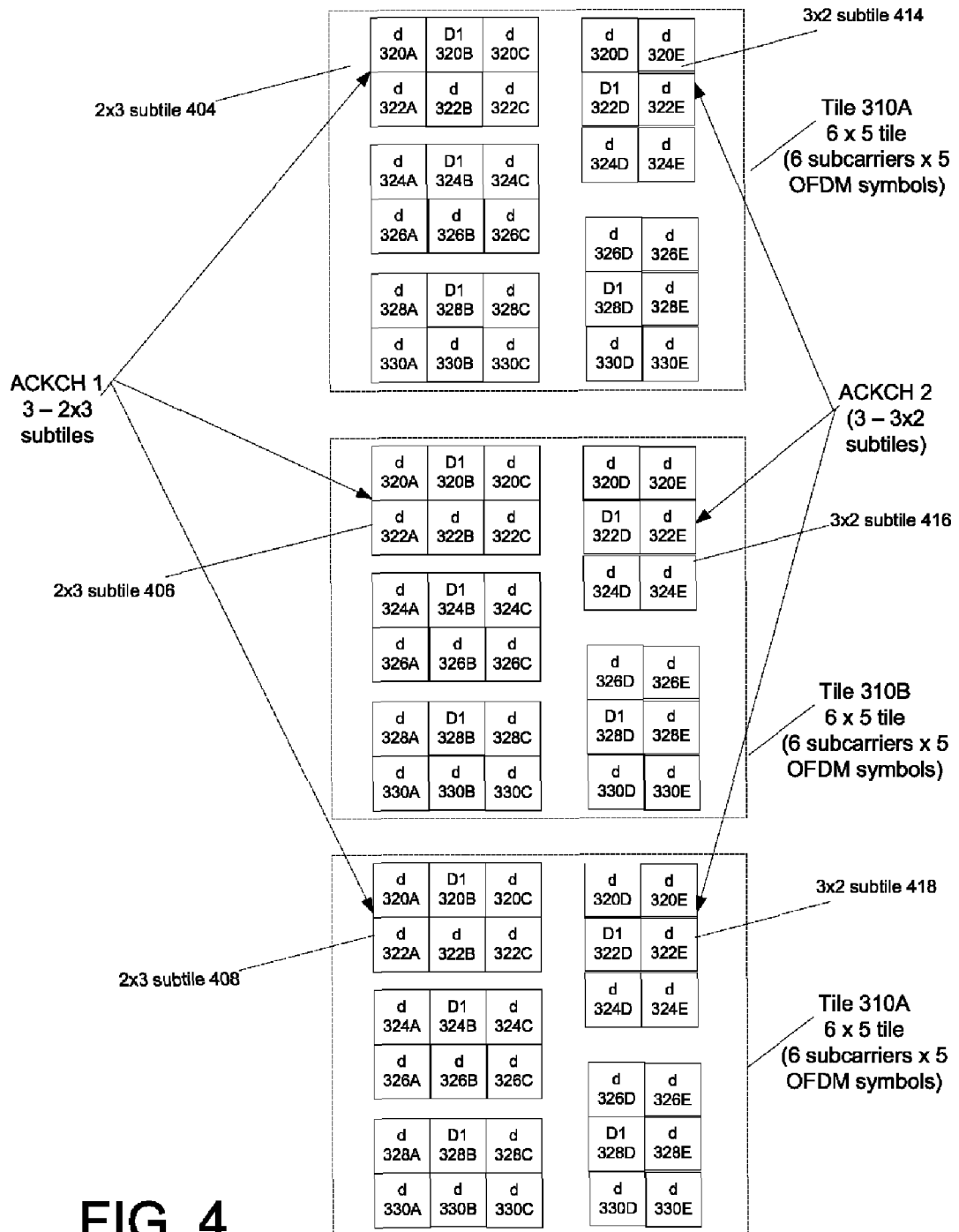
FIG. 4 is a block diagram illustrating an acknowledgement channel that includes three subtiles from three different tiles shown in FIG. 3, according to an example embodiment.

FIG. 4 is a block diagram illustrating an acknowledgement channel that includes three subtiles from three different tiles shown in FIG. 3, according to an example embodiment. Each tile may include 6 subcarriers by $N_{sym}$ OFDM symbols to provide 6*$N_{sym}$ subcarrier symbols in the tile. $N_{sym}$ may identify the number of OFDM symbols per subframe. For example, the example tile 310 shown in FIG. 3 corresponds to $N_{sym}$=5, or 5 OFDM symbols per subframe, which provides 30 subcarrier symbols in tile 310. A Base station (BS) may vary the number of OFDM symbols in each subframe, to make use of the available OFDM symbols/resources. A subframe may include any number of OFDM symbols per subframe, and the tile may include one or more 2×3 subtiles and/or one or more 3×2 subtiles, according to an example embodiment.

Three tiles are shown in FIG. 4, including tiles 310A, 310B and 310C, each of which is a 6×5 tile, including 6 six subcarriers by 5 OFDM symbols. Each of the tiles 310A, 310B and 310C includes three 2×3 subtiles and two 3×2 subtiles. In an example embodiment, a logical resource unit (LRU) may include three tiles such as three of the tiles 310 shown in FIG. 3, as an example (310A, 310B and 310C). In an example embodiment, the LRU may include three tiles having the same format (e.g., same type and number of subtiles). In an example embodiment, resources for an acknowledgement channel (ACKCH), such as for a HARQ (hybrid ARQ) acknowledgement channel may be allocated by a BS to a MS that includes three subtiles including a subtile from each of the three different tiles of the LRU. This may provide an acknowledgement channel with distributed resources (e.g., distributed across time and frequency), which may reduce errors due to interference, multipath fading, etc.

According to an example embodiment, an acknowledgement channel may be allocated to include three subtiles, including a subtile from each of the three different tiles of the LRU. In an example embodiment, each of the tiles of the LRU may include at least one 2×3 subtile that includes 2 subcarriers by 3 OFDM symbols, and at least one 3×2 subtile that includes 3 subcarriers by 2 OFDM symbols. In the example shown in FIG. 3, the tile 310 may include three 2×3 subtiles and two 3×2 subtiles, as an example.

In an example embodiment, one or more acknowledgement channels allocated from an LRU may include three subtiles of the same type (e.g., either 2×3 subtiles or 3×2 subtiles and/or having a same pilot subcarrier pattern), with one subtile from each tile of the LRU. Also, according to an example embodiment, three corresponding subtiles may be selected, with a corresponding (e.g., at the same subtile location within the tile) subtile selected from each tile of the LRU. As shown in the example of FIG. 4, a first acknowledgement channel (ACKCH 1) may include three 2×3 subtiles, including 2×3 subtile 404 from tile 310A, 2×3 subtile 406 from tile 310B, and 2×3 subtile 408 from tile 310C. Each of these subtiles (404, 406 and 408) is from a different tile (310A, 310B and 310C, respectively). Also, in an example embodiment, the three subtiles of the acknowledgement channel (ACKCH) may be corresponding subtiles, e.g., in this example, subtiles 404, 406 and 408 are each located as the upper left 2×3 subtile of their respective tiles.

Referring to FIG. 4, a second acknowledgement channel (ACK 2) may include three 3×2 subtiles, including a 3×2 subtile from each of the three different tiles of the LRU. For example, the second acknowledgement channel may include 3×2 subtile 414 of tile 310A, 3×2 subtile 416 from tile 310B, and 3×2 subtile 418 from tile 310C.

An acknowledgement channel that includes a group of three 2×3 subtiles (such as acknowledgement channel 1 or ACKCH 1 in FIG. 4) may be referred to as a horizontal acknowledgement channel, since the subtiles are horizontal in shape (wider than tall). Similarly, an acknowledgement channel (such as acknowledgement channel 2 or ACKCH 2 in FIG. 4) that includes a group of three 3×2 subtiles may be referred to as a vertical acknowledgement channel, for example.

Note that both vertical and horizontal acknowledgement channels include the same numbers of pilot subcarrier symbols (3) and the same numbers of data subcarrier symbols (15), according to this example embodiment. For subtiles having a different pilot subcarrier pattern (e.g., having two pilot subcarrier symbols, D1, D2, per subtile), the total number of pilot subcarrier symbols and/or data subcarrier symbols per acknowledgement channel will vary accordingly. Although only two acknowledgement channels are identified in FIG. 4, the three tiles 310A, 310B and 310C, each being 6 subcarriers by 5 OFDM symbols (and each tile having 5 subtiles), may be divided into 5 different acknowledgment channels, including three horizontal acknowledgement channels and two vertical acknowledgement channels. The BS may thus allocate each of the 5 acknowledgement channels in FIG. 4 to a different MS or user, for example, to allow the MS to send an acknowledgement (ACK) or negative acknowledgement (NACK) to acknowledge or negatively acknowledge the receipt of data, for example.

For both types of acknowledgement channels (both horizontal and vertical acknowledgement channels), each acknowledgement channel includes 15 data subcarriers (or 15 data subcarrier symbols) for a single transmit antenna case (e.g., where one pilot subcarrier symbol per subtile), and may include 12 data subcarrier symbols for the double transmit antenna case (e.g., where each subtile includes two pilot subcarrier symbols per subtile, leaving only four data subcarrier symbols per subtile). The 1-bit ACK/NAK information may, for example, be modulated onto the data subcarriers (or data subcarrier symbols). In an example embodiment, to transmit the ACK signaling, $$\frac{\sqrt{2}}{2}(1+j)$$

may be transmitted over all the data subcarriers (or over all data subcarrier symbols) of the acknowledgement channel; and to transmit NAK, $$-\frac{\sqrt{2}}{2}(1+j)$$

may be transmitted over all the data subcarriers (or all the data subcarrier symbols) per acknowledgement channel. This simple modulation method, shown merely as an example, may allow, at least in some cases, a maximum Euclidean distance to be provided between ACK (acknowledgement) and NAK (negative acknowledgement) signaling.

Note that the example in FIG. 4 shows acknowledgement channels (e.g., including a subtile from each of three different tiles) according to an example embodiment. Acknowledgement channels may be similarly provided for tiles and subtiles of other formats and sizes, as described herein. A group of 3 tiles in a LRU is not specifically illustrated for such other format and size tiles and subtiles, although an acknowledgement channel may be provided in such other types of tiles/subtiles in a same or similar manner to that illustrated and described with reference to FIG. 4, as an example.

The method may be extended to other subframe structures. E.g. there could be the cases that one subframe contains 4 OFDMA symbols, then one LRU could be divided into 4 acknowledgement channels, all of which are made up of 3*2 sub-tiles, for example. The reason is that each tile contains 6*$N_{sym}$ subcarriers, where $N_{sym}$ is the number of OFDM (or OFDMA) symbols. Both types of proposed sub-tile structures (2×3, and 3×2) contain 6 subcarriers (6 subcarrier symbols). Therefore, one tile may be divided into $N_{sym}$ subtiles (of the two types mixed), e.g., if $N_{sym}$>1.

Figure 5:
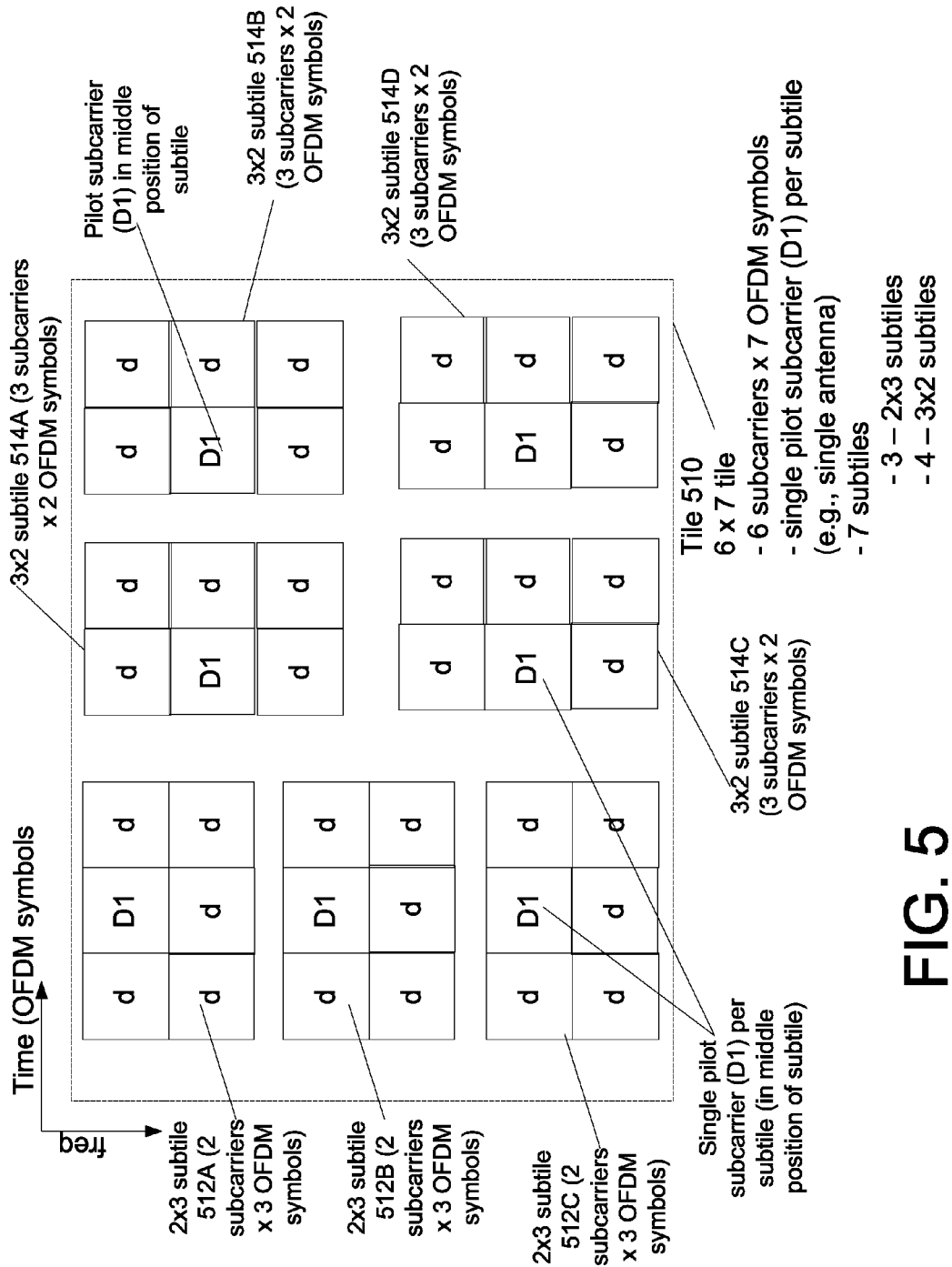
FIG. 5 is a block diagram illustrating a tile structure associated with seven OFDM symbols per subframe and a single antenna according to an example embodiment.

FIG. 5 is a block diagram illustrating a tile structure associated with seven OFDM symbols per subframe and a single antenna according to an example embodiment. The tile 510 illustrated in FIG. 5 may include 6 subcarriers by 7 OFDM symbols, providing a total of 42 subcarrier symbols for the tile 510. Tile 510 may include three 2×3 subtiles including subtiles 512A, 512B and 512C, with each of these 2×3 subtiles including five data subcarrier symbols (d) and one pilot subcarrier symbol (D1, e.g., for single transmit antenna) provided in a middle location of the subtile. The tile 510 may also include four 3×2 subtiles including subtiles 514A, 514B, 514C and 514D, with each of these 3×2 subtiles including five data subcarrier symbols (d) and one pilot subcarrier symbol (D1) provided at a middle location of the subtile.

Figure 6:
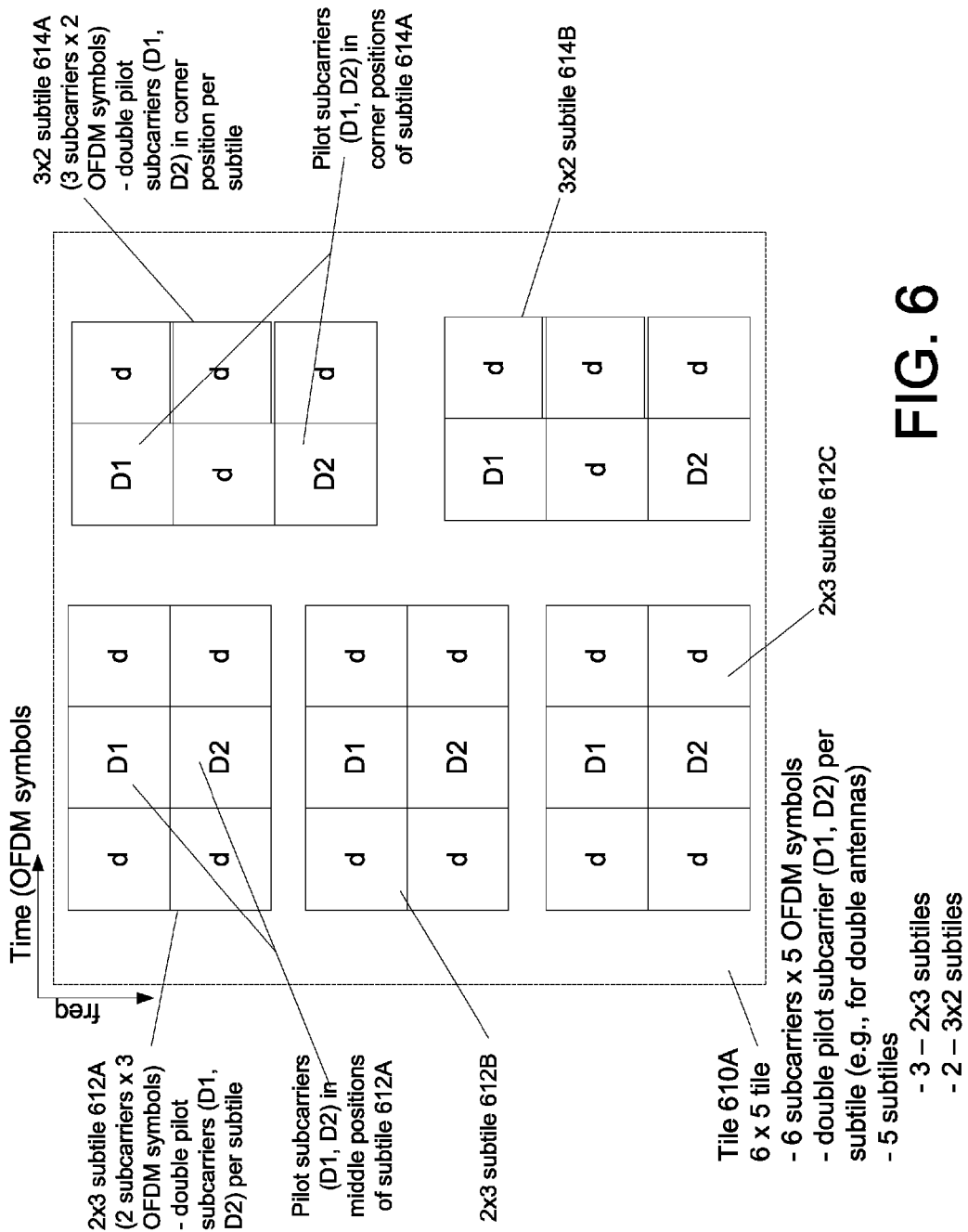
FIG. 6 is a block diagram illustrating a tile structure associated with five OFDM symbols per subframe and two antennas according to an example embodiment.

FIG. 6 is a block diagram illustrating a tile structure associated with five OFDM symbols per subframe and two antennas according to an example embodiment. Tile 610A illustrated in FIG. 6 includes 6 subcarriers by 5 OFDM symbols to provide a total of 30 subcarrier symbols. Tile 610A includes three 2×3 subtiles 612A, 612B, and 612C with each of these 2×3 subtiles including four data subcarrier symbols (d), and two pilot subcarrier symbols (D1, D2) provided in middle positions of their subtiles. The tile 610A also includes two 3×2 subtiles 614A and 614B with both of these 3×2 subtiles including four data subcarrier symbols and two pilot subcarrier symbols provided at corner positions of the subtile. For example, 3×2 subtile 614A includes four data subcarrier symbols (d) and two pilot subcarrier symbols, including D1 provided at an upper left corner of the subtile, and D2 provided at a lower left corner of the subtile 614A. These are two example corner positions of the subtile, although the upper right hand corner and lower right hand corner also are corner positions of the subtile.

Figure 7:
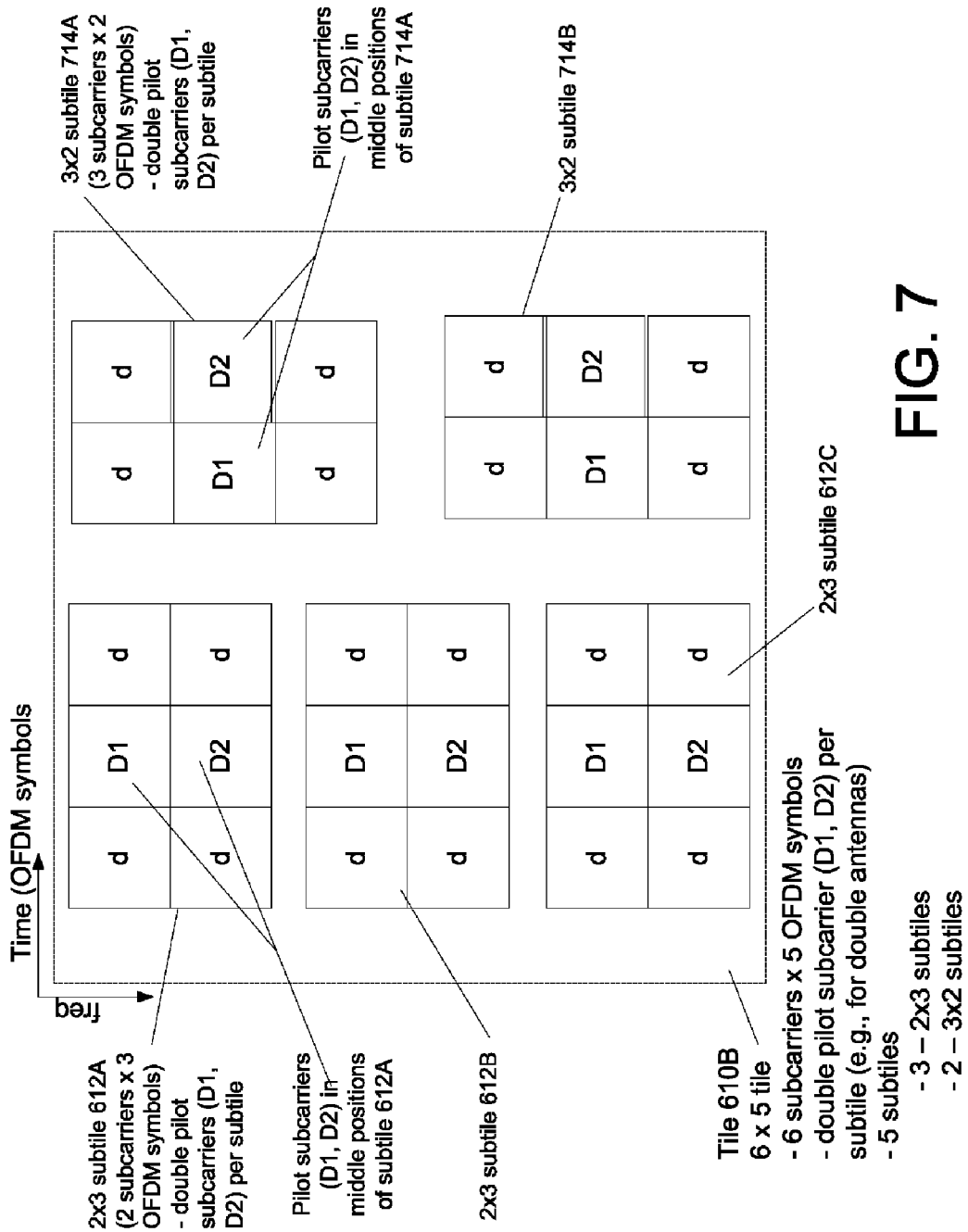
FIG. 7 is a block diagram illustrating a tile structure associated with five OFDM symbols per subframe and two antennas according to another example embodiment.

FIG. 7 is a block diagram illustrating a tile structure associated with five OFDM symbols per subframe and two antennas according to another example embodiment. The tile 610B illustrated in FIG. 7 is very similar to the tile 610A of FIG. 6, except the pilot subcarrier pattern for the 3×2 subtiles for the tile 610B (FIG. 7) is different than the pilot pattern of the tile 610A (FIG. 6). The 2×3 subtiles 612A, 612B and 612C are the same (or substantially the same) as those in FIG. 6. In FIG. 7, the two 3×2 subtiles each include four data subcarrier symbols (d) and two pilot subcarrier symbols (D1 and D2) provided in middle locations of the subtile.

Figure 8:
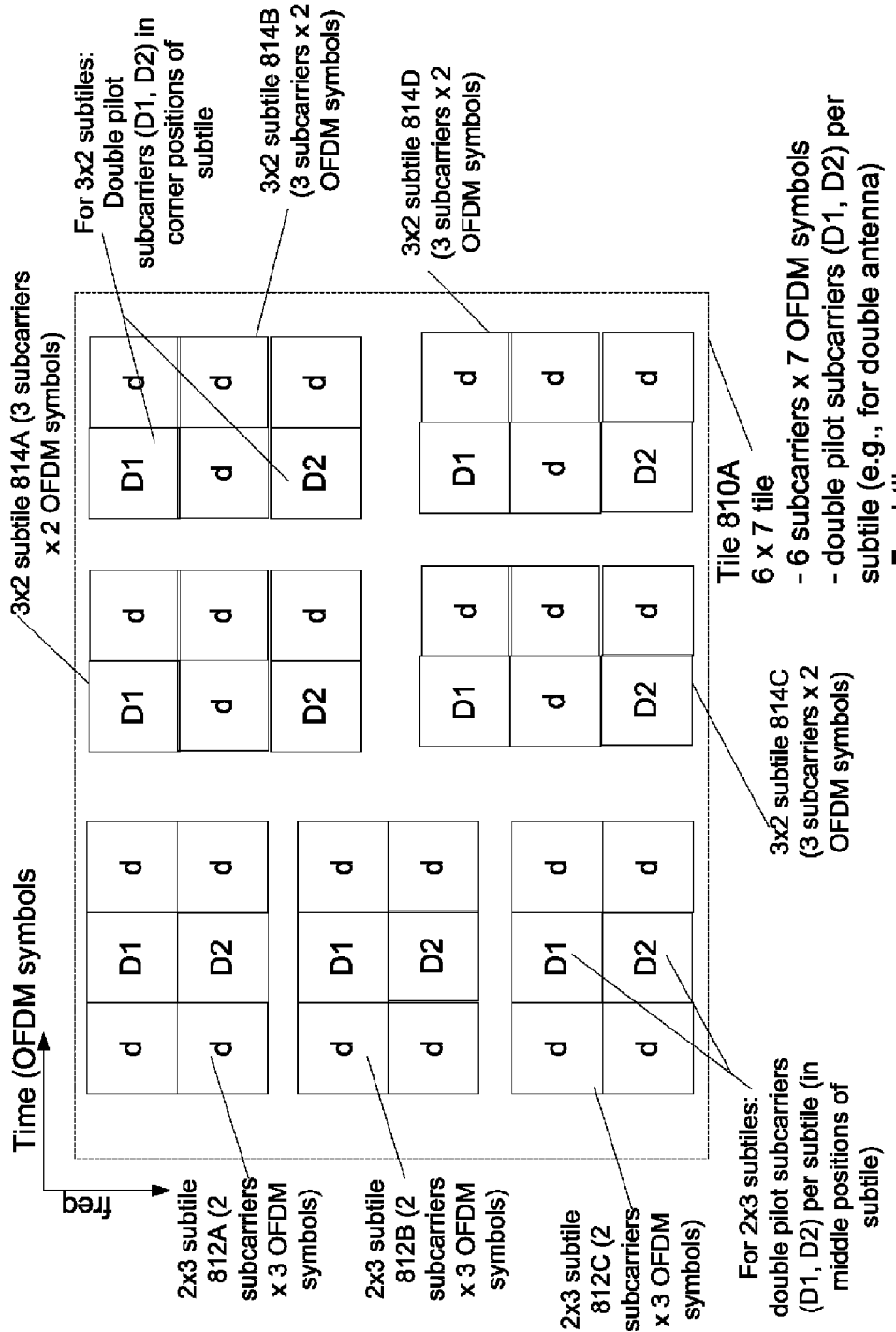
FIG. 8 is a block diagram illustrating a tile structure associated with seven OFDM symbols per subframe and two antennas according to an example embodiment.

FIG. 8 is a block diagram illustrating a tile structure associated with seven OFDM symbols per subframe and two antennas according to an example embodiment. Tile 810A includes 6 subcarriers by 7 OFDM symbols, to provide 42 subcarrier symbols. Tile 810A includes three 2×3 subtiles 812A, 812B and 812C where each 2×3 subtile includes four data subcarrier symbols and two pilot subcarrier symbols (D1, D2) in a middle location of the subtile. Tile 810A also includes four 3×2 subtiles including subtiles 814A, 814B, 814C and 814D, where each of these 3×2 subtiles includes four data subcarrier symbols and two pilot subcarrier symbols (D1, D2) that are provided in corner locations of the subtile.

Figure 9:
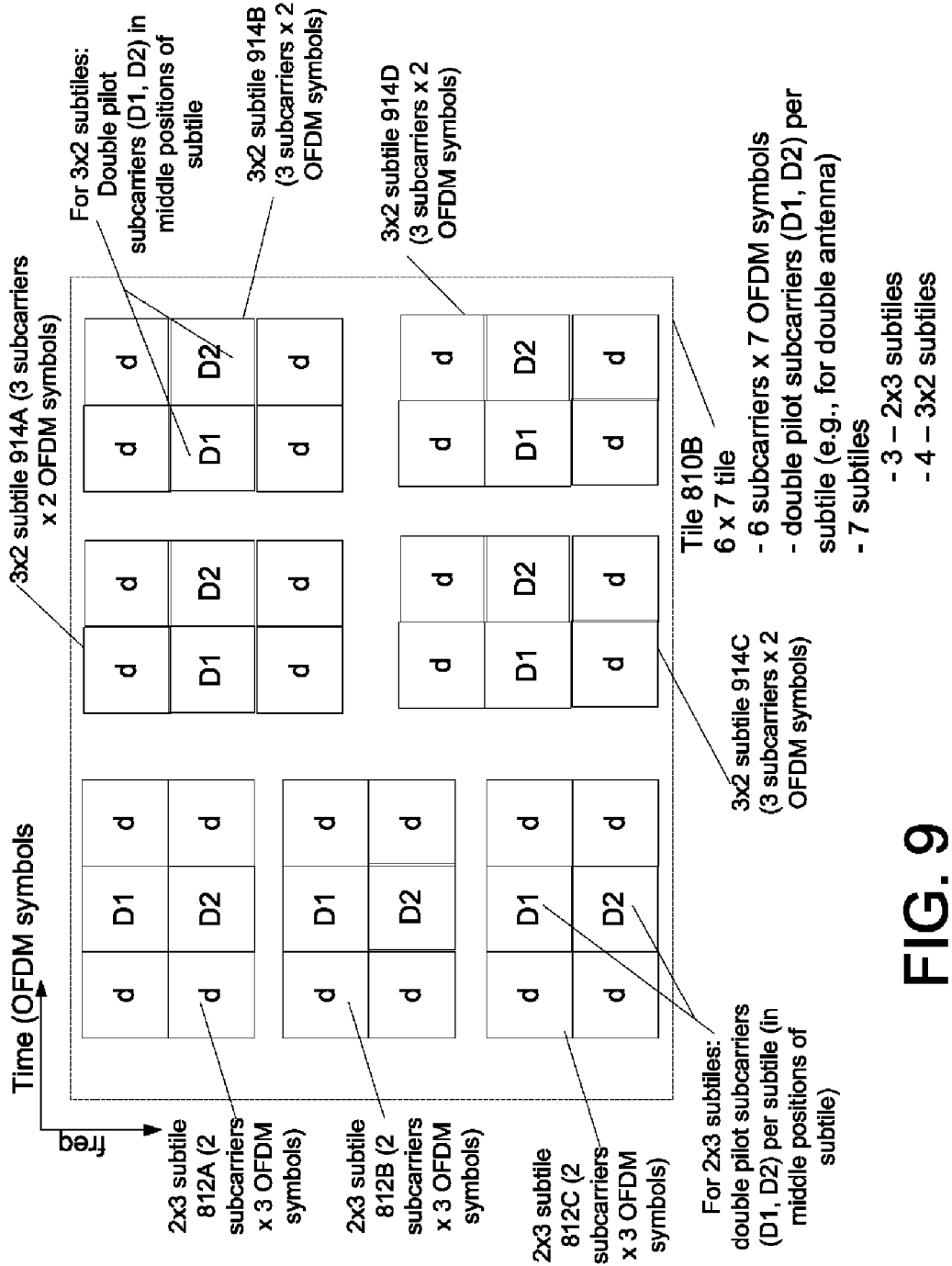
FIG. 9 is a block diagram illustrating a tile structure associated with seven OFDM symbols per subframe and two antennas according to another example embodiment.

FIG. 9 is a block diagram illustrating a tile structure associated with seven OFDM symbols per subframe and two antennas according to another example embodiment. The tile 810B illustrated in FIG. 9 is very similar to the tile 810A of FIG. 8, except the pilot subcarrier pattern for the 3×2 subtiles for the tile 810B (FIG. 9) is different than the pilot pattern of the tile 810A (FIG. 8). The 2×3 subtiles 812A, 812B and 812C are the same (or substantially the same) as those in FIG. 8. In FIG. 9, the four 3×2 subtiles each include four data subcarrier symbols (d) and two pilot subcarrier symbols (D1 and D2) provided in middle locations of the subtile.

Figure 10:
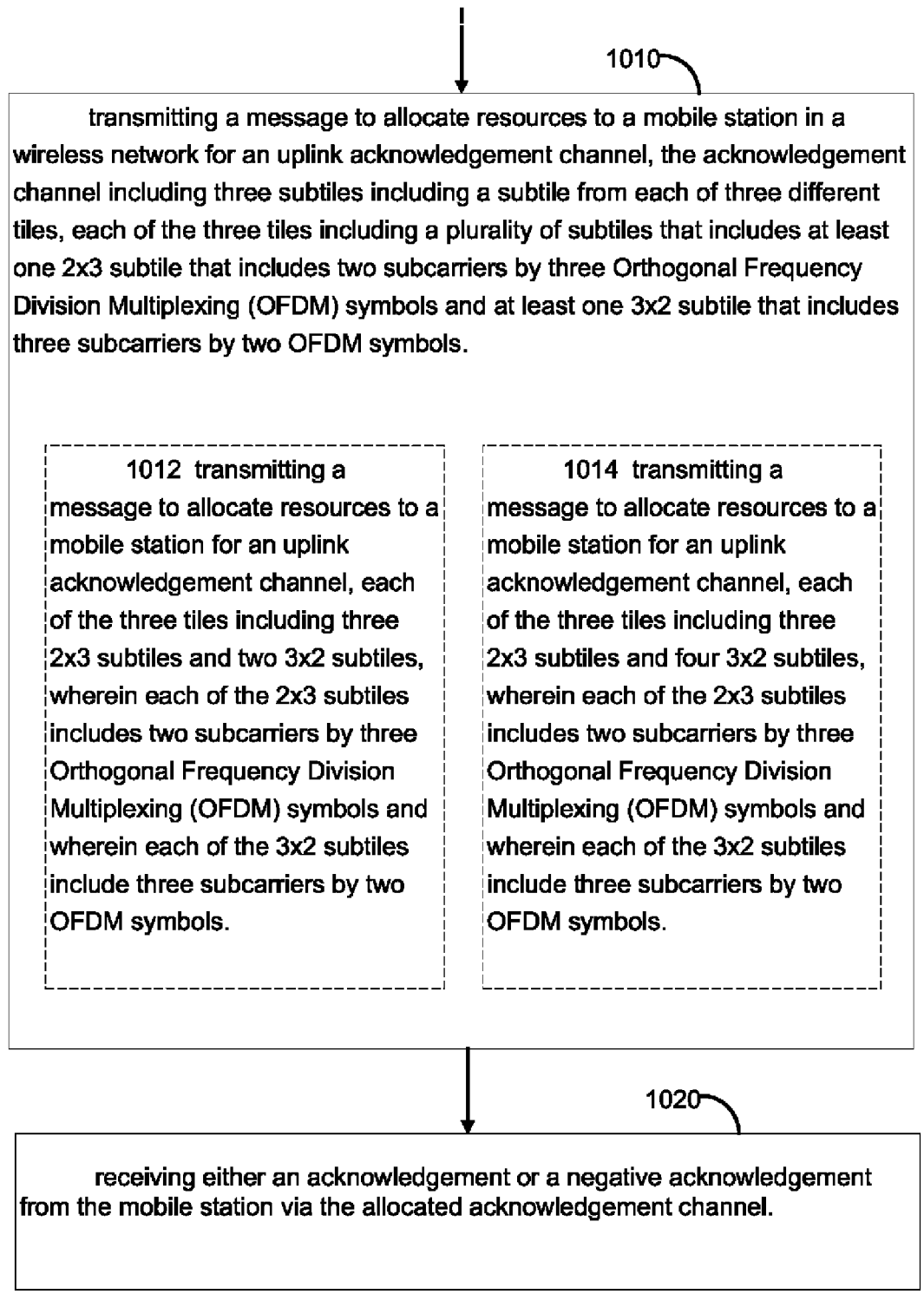
FIG. 10 is a flow chart illustrating operation of a wireless node according to an example embodiment.

FIG. 10 is a flow chart illustrating operation of a wireless node according to an example embodiment. Operation 1010 may include transmitting a message to allocate resources to a mobile station in a wireless network for an uplink acknowledgement channel, the acknowledgement channel including three subtiles including a subtile from each of three different tiles, each of the three tiles including a plurality of subtiles that includes at least one 2×3 subtile that includes two subcarriers by three Orthogonal Frequency Division Multiplexing (OFDM) symbols and at least one 3×2 subtile that includes three subcarriers by two OFDM symbols.

Transmitting operation 1010 may include one or more additional operations, including operation 1012 and/or operation 1014.

Operation 1012 may include transmitting a message to allocate resources to a mobile station for an uplink acknowledgement channel, each of the three tiles including three 2×3 subtiles and two 3×2 subtiles, wherein each of the 2×3 subtiles includes two subcarriers by three Orthogonal Frequency Division Multiplexing (OFDM) symbols and wherein each of the 3×2 subtiles include three subcarriers by two OFDM symbols.

Operation 1014 may include transmitting a message to allocate resources to a mobile station for an uplink acknowledgement channel, each of the three tiles including three 2×3 subtiles and four 3×2 subtiles, wherein each of the 2×3 subtiles includes two subcarriers by three Orthogonal Frequency Division Multiplexing (OFDM) symbols and wherein each of the 3×2 subtiles include three subcarriers by two OFDM symbols.

The flow chart of FIG. 10 may include an additional operation, including 1020. Operation 1020 may include receiving either an acknowledgement or a negative acknowledgement from the mobile station via the allocated acknowledgement channel.

The flow chart of FIG. 10 wherein the transmitting operation 1010 may include transmitting scheduling information or Map information to the mobile station in the wireless network to allocate the resources to the mobile station for the uplink acknowledgement channel.

The flow chart of FIG. 10 wherein the transmitting operation 1010 may include transmitting a message to allocate resources to a mobile station for an uplink acknowledgement channel, wherein each of the three tiles includes six subcarriers by $N_{sym}$ Orthogonal Frequency Division Multiplexing (OFDM) symbols to provide $6*N_{sym}$ subcarrier symbols, where $N_{sym}$ is a number of OFDM symbols per subframe.

The flow chart of FIG. 10 wherein the transmitting operation 1010 may include transmitting a message to allocate resources to a mobile station for an uplink acknowledgement channel, wherein each of the three tiles includes six subcarriers by five Orthogonal Frequency Division Multiplexing (OFDM) symbols to provide 30 subcarrier symbols.

The flow chart of FIG. 10 wherein the transmitting operation 1010 may include transmitting a message to allocate resources to a mobile station for an uplink acknowledgement channel, wherein each of the three subtiles of the acknowledgement channel has a same subtile pattern that is either a 2×3 subtile that includes two subcarriers by three Orthogonal Frequency Division Multiplexing (OFDM) symbols or a 3×2 subtile that includes three subcarriers by two OFDM symbols.

The flow chart of FIG. 10 wherein the transmitting operation 1010 may include transmitting a message to allocate resources to a mobile station for an uplink acknowledgement channel, wherein each of the three subtiles of the acknowledgement channel is a 2×3 subtile that includes two subcarriers by three Orthogonal Frequency Division Multiplexing (OFDM) symbols.

The flow chart of FIG. 10 wherein each of the 2×3 subtiles of the acknowledgement channel includes five data subcarrier symbols and one pilot subcarrier symbol, the pilot subcarrier symbol being provided in one of two middle locations of the subcarrier symbols within the subtile.

The flow chart of FIG. 10 wherein each of the 2×3 subtiles of the acknowledgement channel includes four data subcarrier symbols and two pilot subcarrier symbols, the pilot subcarrier symbols being provided in middle locations of the subcarrier symbols within the subtile.

The flow chart of FIG. 10 wherein the transmitting operation 1010 may include transmitting a message to allocate resources to a mobile station for an uplink acknowledgement channel, wherein each of the three subtiles of the acknowledgement channel is a 3×2 subtile that includes three subcarriers by two Orthogonal Frequency Division Multiplexing (OFDM) symbols.

The flow chart of FIG. 10 wherein each of the 3×2 subtiles of the acknowledgement channel includes five data subcarrier symbols and one pilot subcarrier symbol, the pilot subcarrier symbol being provided in one of two middle locations of the subcarrier symbols within the subtile.

The flow chart of FIG. 10 wherein each of the 3×2 subtiles of the acknowledgement channel includes four data subcarrier symbols and two pilot subcarrier symbols, the pilot subcarrier symbols being provided in corner locations of the subcarrier symbols within the subtile.

The flow chart of FIG. 10 wherein each of the 3×2 subtiles of the acknowledgement channel includes four data subcarrier symbols and two pilot subcarrier symbols, the pilot subcarrier symbols being provided in middle locations of the subcarrier symbols within the subtile.

The flow chart of FIG. 10 wherein the transmitting operation 1010 may include transmitting a message to allocate resources to a mobile station for an uplink acknowledgement channel, wherein each of the three tiles includes six subcarriers by seven Orthogonal Frequency Division Multiplexing (OFDM) symbols to provide 42 subcarrier symbols.

According to an example embodiment, an apparatus may include a wireless transceiver, and a controller coupled to the transceiver. The apparatus may be configured to transmit a message to allocate resources to a mobile station in a wireless network for an uplink acknowledgement channel, the acknowledgement channel including three subtiles including a subtile from each of three different tiles, each of the three tiles including a plurality of subtiles that includes at least one 2×3 subtile that includes two subcarriers by three Orthogonal Frequency Division Multiplexing (OFDM) symbols and at least one 3×2 subtile that includes three subcarriers by two OFDM symbols. Several alternative embodiments with respect to the apparatus are briefly described below.

According to another example embodiment, the apparatus may be further configured to transmit scheduling information or Map information to the mobile station in the wireless network to allocate the resources to the mobile station for the uplink acknowledgement channel.

According to another example embodiment each of the three tiles includes six subcarriers by $N_{sym}$ Orthogonal Frequency Division Multiplexing (OFDM) symbols to provide $6*N_{sym}$ subcarrier symbols, where $N_{sym}$ is a number of OFDM symbols per subframe.

According to another example embodiment, each of the three tiles includes six subcarriers by five Orthogonal Frequency Division Multiplexing (OFDM) symbols to provide 30 subcarrier symbols.

According to another example embodiment, each of the three tiles may include three 2×3 subtiles and two 3×2 subtiles, wherein each of the 2×3 subtiles includes two subcarriers by three Orthogonal Frequency Division Multiplexing (OFDM) symbols and wherein each of the 3×2 subtiles include three subcarriers by two OFDM symbols.

According to another example embodiment, each of the three subtiles of the acknowledgement channel has a same subtile pattern that is either a 2×3 subtile that includes two subcarriers by three Orthogonal Frequency Division Multiplexing (OFDM) symbols or a 3×2 subtile that includes three subcarriers by two OFDM symbols.

According to another example embodiment, each of the three subtiles of the acknowledgement channel may be a 2×3 subtile that includes two subcarriers by three Orthogonal Frequency Division Multiplexing (OFDM) symbols.

According to another example embodiment, each of the 2×3 subtiles of the acknowledgement channel includes five data subcarrier symbols and one pilot subcarrier symbol, the pilot subcarrier symbol being provided in one of two middle locations of the subcarrier symbols within the subtile.

According to another example embodiment, each of the 2×3 subtiles of the acknowledgement channel includes four data subcarrier symbols and two pilot subcarrier symbols, the pilot subcarrier symbols being provided in middle locations of the subcarrier symbols within the subtile.

According to another example embodiment each of the three subtiles of the acknowledgement channel is a 3×2 subtile that includes three subcarriers by two Orthogonal Frequency Division Multiplexing (OFDM) symbols.

According to another example embodiment, each of the 3×2 subtiles of the acknowledgement channel includes five data subcarrier symbols and one pilot subcarrier symbol, the pilot subcarrier symbol being provided in one of two middle locations of the subcarrier symbols within the subtile.

According to another example embodiment, each of the 3×2 subtiles of the acknowledgement channel includes four data subcarrier symbols and two pilot subcarrier symbols, the pilot subcarrier symbols being provided in corner locations of the subcarrier symbols within the subtile.

According to another example embodiment, each of the 3×2 subtiles of the acknowledgement channel includes four data subcarrier symbols and two pilot subcarrier symbols, the pilot subcarrier symbols being provided in middle locations of the subcarrier symbols within the subtile.

According to another example embodiment, each of the three tiles includes six subcarriers by seven Orthogonal Frequency Division Multiplexing (OFDM) symbols to provide 42 subcarrier symbols.

According to another example embodiment, each of the three tiles includes three 2×3 subtiles and four 3×2 subtiles, wherein each of the 2×3 subtiles includes two subcarriers by three Orthogonal Frequency Division Multiplexing (OFDM) symbols and wherein each of the 3×2 subtiles include three subcarriers by two OFDM symbols.

Figure 11:
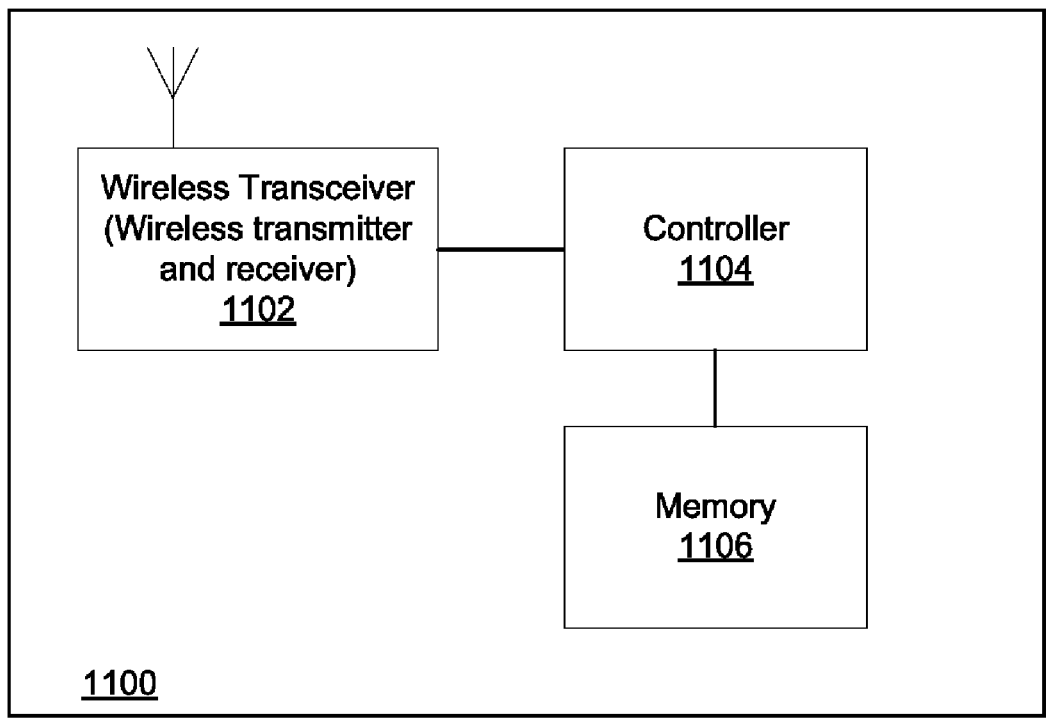
FIG. 11 is a block diagram of a wireless node according to an example embodiment.

FIG. 11 is a block diagram of a wireless station (or wireless node) 1100 according to an example embodiment. The wireless station 1100 (e.g. base station 104 or mobile node 106, 108, 110) may include, for example, a wireless transceiver (or wireless interface) 1102, including a transmitter to transmit signals and a receiver to receive signals, a controller 1104 to control operation of the station and execute instructions or software, and a memory 1106 to store data and/or instructions. Controller 1104 may also make decisions or determinations, generate frames or messages for transmission, decode received frames or messages for further processing, and other tasks or functions described herein.

Controller (or processor) 1104 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 1104, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
transmitting a message to allocate resources to a mobile station in a wireless network for an uplink acknowledgement channel, the acknowledgement channel including three subtiles including at least one $2 \times N_{sym}$ subtile that includes two subcarriers by $N_{sym}$ Orthogonal Frequency Division Multiplexing (OFDM) symbols.

2. A method of claim 1 and further wherein the three subtiles including at least one subtile from each of three different tiles, each of the three tiles including a plurality of subtiles.

3. A method of claim 2 and further wherein the three subtiles includes at least one 2×3 subtile that includes two subcarriers by three Orthogonal Frequency Division Multiplexing (OFDM) symbols and at least one 3×2 subtile that includes three subcarriers by two OFDM symbols.

4. The method of claim 3 wherein the transmitting a message comprises transmitting a message to allocate resources to a mobile station for an uplink acknowledgement channel, each of the three tiles including three 2×3 subtiles and two 3×2 subtiles, wherein each of the 2×3 subtiles includes two subcarriers by three Orthogonal Frequency Division Multiplexing (OFDM) symbols and wherein each of the 3×2 subtiles include three subcarriers by two OFDM symbols.

5. The method of claim 3 wherein the transmitting a message comprises transmitting a message to allocate resources to a mobile station for an uplink acknowledgement channel, wherein each of the three subtiles of the acknowledgement channel has a same subtile pattern that is either a 2×3 subtile that includes two subcarriers by three Orthogonal Frequency Division Multiplexing (OFDM) symbols or a 3×2 subtile that includes three subcarriers by two OFDM symbols.

6. The method of claim 3 wherein the transmitting a message comprises transmitting a message to allocate resources to a mobile station for an uplink acknowledgement channel, wherein each of the three subtiles of the acknowledgement channel is a 2×3 subtile that includes two subcarriers by three Orthogonal Frequency Division Multiplexing (OFDM) symbols.

7. The method of claim 6 wherein each of the 2×3 subtiles of the acknowledgement channel includes five data subcarrier symbols and one pilot subcarrier symbol, the pilot subcarrier symbol being provided in one of two middle locations of the subcarrier symbols within the subtile.

8. The method of claim 6 wherein each of the 2×3 subtiles of the acknowledgement channel includes four data subcarrier symbols and two pilot subcarrier symbols, the pilot subcarrier symbols being provided in middle locations of the subcarrier symbols within the subtile.

9. The method of claim 3 wherein the transmitting a message comprises transmitting a message to allocate resources to a mobile station for an uplink acknowledgement channel, wherein each of the three subtiles of the acknowledgement channel is a 3×2 subtile that includes three subcarriers by two Orthogonal Frequency Division Multiplexing (OFDM) symbols.

10. The method of claim 9 wherein each of the 3×2 subtiles of the acknowledgement channel includes five data subcarrier symbols and one pilot subcarrier symbol, the pilot subcarrier symbol being provided in one of two middle locations of the subcarrier symbols within the subtile.

11. The method of claim 9 wherein each of the 3×2 subtiles of the acknowledgement channel includes four data subcarrier symbols and two pilot subcarrier symbols, the pilot subcarrier symbols being provided in corner locations of the subcarrier symbols within the subtile.

12. The method of claim 9 wherein each of the 3×2 subtiles of the acknowledgement channel includes four data subcarrier symbols and two pilot subcarrier symbols, the pilot subcarrier symbols being provided in middle locations of the subcarrier symbols within the subtile.

13. The method of claim 3 wherein the transmitting a message comprises transmitting a message to allocate resources to a mobile station for an uplink acknowledgement channel, wherein each of the three tiles includes six subcarriers by seven Orthogonal Frequency Division Multiplexing (OFDM) symbols to provide 42 subcarrier symbols.

14. The method of claim 3 wherein the transmitting a message comprises transmitting a message to allocate resources to a mobile station for an uplink acknowledgement channel, each of the three tiles including three 2×3 subtiles and four 3×2 subtiles, wherein each of the 2×3 subtiles includes two subcarriers by three Orthogonal Frequency Division Multiplexing (OFDM) symbols and wherein each of the 3×2 subtiles include three subcarriers by two OFDM symbols.

15. The method of claim 2 wherein the transmitting a message comprises transmitting a message to allocate resources to a mobile station for an uplink acknowledgement channel, wherein each of the three tiles includes six subcarriers by $N_{sym}$ Orthogonal Frequency Division Multiplexing (OFDM) symbols to provide $6*N_{sym}$ subcarrier symbols, where $N_{sym}$ is a number of OFDM symbols per subframe.

16. The method of claim 2 wherein the transmitting a message comprises transmitting a message to allocate resources to a mobile station for an uplink acknowledgement channel, wherein each of the three tiles includes six subcarriers by five Orthogonal Frequency Division Multiplexing (OFDM) symbols to provide 30 subcarrier symbols.

17. The method of claim 1 and further comprising receiving either an acknowledgement or a negative acknowledgement from the mobile station via the allocated acknowledgement channel.

18. The method of claim 1 wherein the transmitting a message comprises transmitting scheduling information or Map information to the mobile station in the wireless network to allocate the resources to the mobile station for the uplink acknowledgement channel.

19. An apparatus comprising:
a wireless transceiver;
a controller coupled to the transceiver;
the apparatus configured to
transmit a message to allocate resources to a mobile station in a wireless network for an uplink acknowledgement channel, the acknowledgement channel including three subtiles including at least one $2 \times N_{sym}$ subtile that includes two subcarriers by $N_{sym}$ Orthogonal Frequency Division Multiplexing (OFDM) symbols.

20. A method of claim 19 and further wherein the three subtiles including at least one subtile from each of three different tiles, each of the three tiles including a plurality of subtiles.

* * * * *

UNITED STATES PATENT AND TRADEMARK OFFICE
CERTIFICATE OF CORRECTION

| | | |
|---|---|---|
| PATENT NO. | : 8,208,362 B2 | Page 1 of 1 |
| APPLICATION NO. | : 12/553644 | |
| DATED | : June 26, 2012 | |
| INVENTOR(S) | : Xin Qi et al. | |

It is certified that error appears in the above-identified patent and that said Letters Patent is hereby corrected as shown below:

In column 16, line 24, in claim 20, delete "A method" and insert -- The apparatus --, therefor.

Signed and Sealed this
Second Day of October, 2012

David J. Kappos
*Director of the United States Patent and Trademark Office*